Oct. 3, 1933.                 H. T. ANDERSON                 1,928,826
                         LEVELING AND SAFETY DEVICE
                    Filed Aug. 5, 1929          2 Sheets-Sheet 1
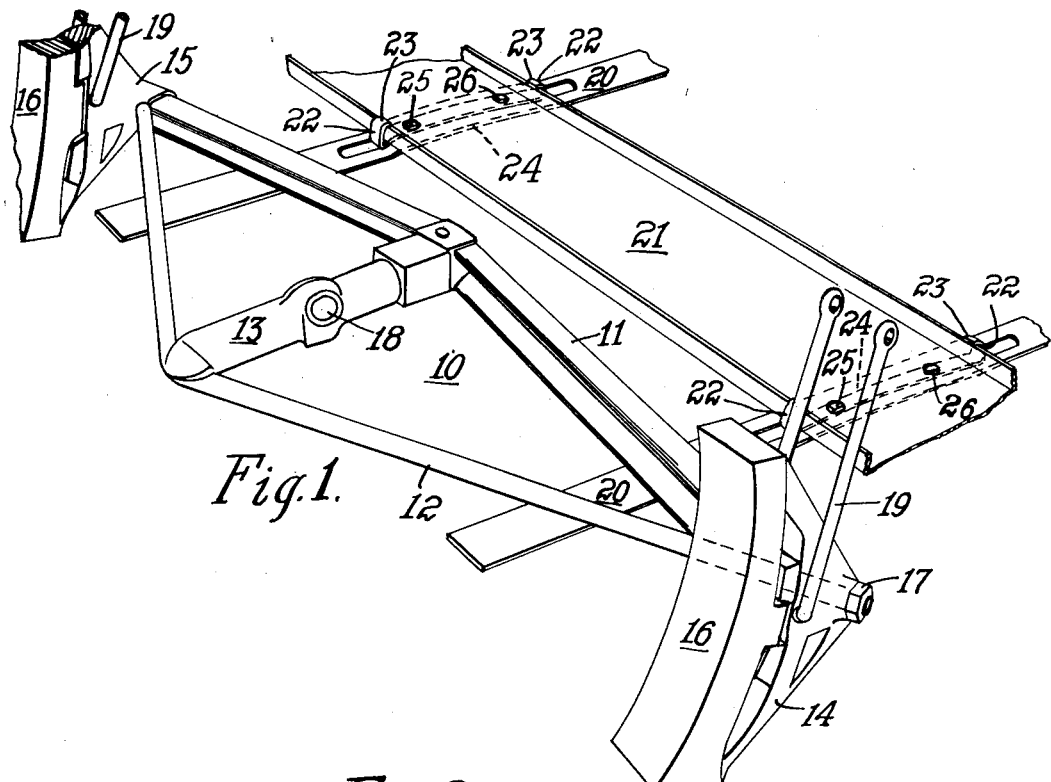
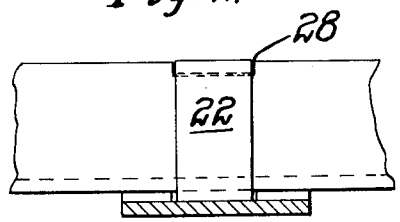
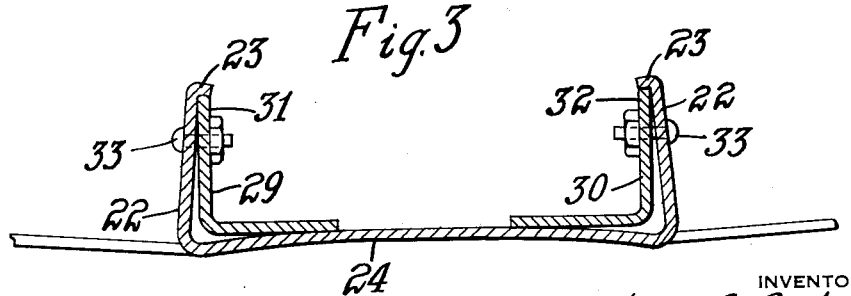
INVENTOR
Harry T. Anderson
By Green & McCallister
His Attorneys Oct. 3, 1933. H. T. ANDERSON 1,928,826
LEVELING AND SAFETY DEVICE
Filed Aug. 5, 1929 2 Sheets-Sheet 2
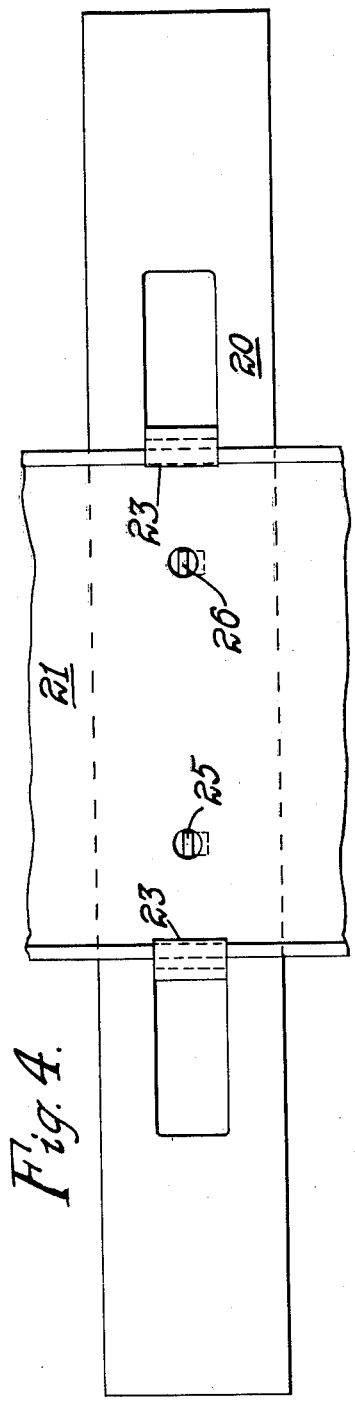
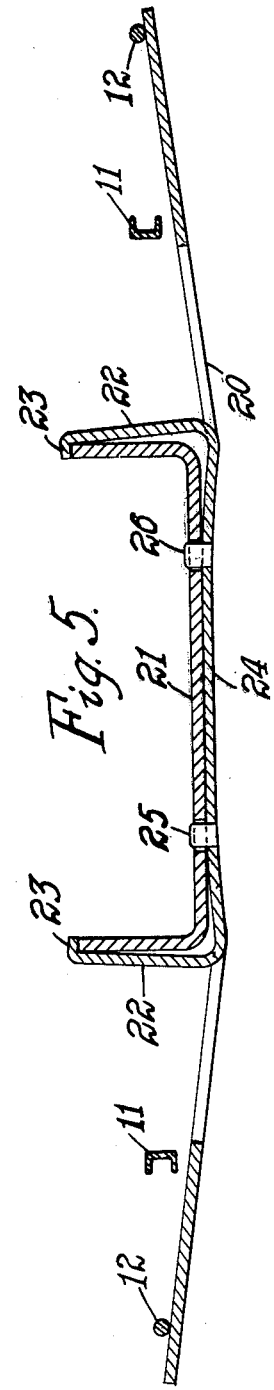
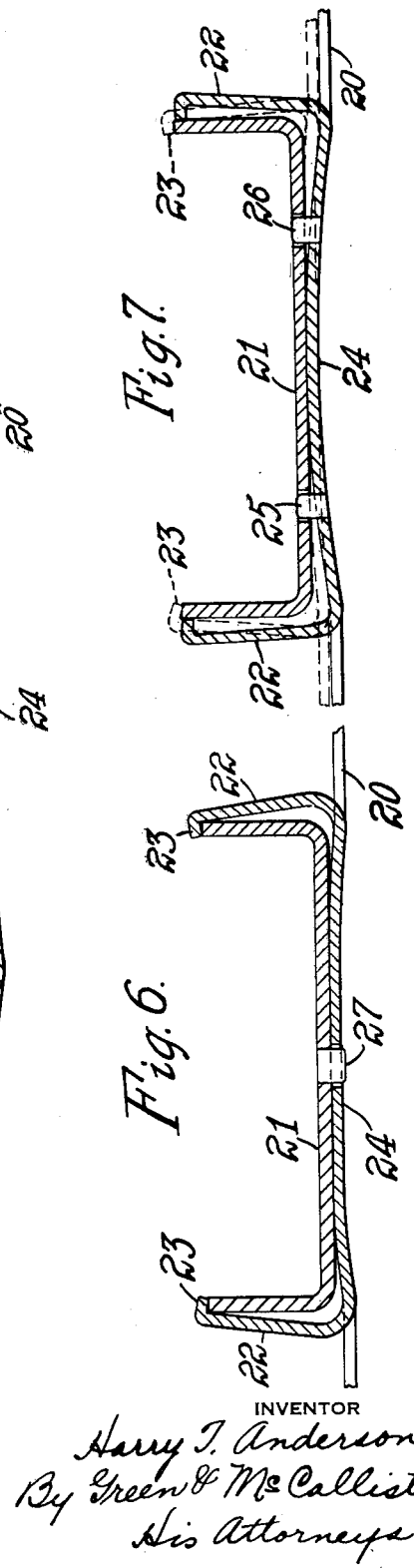
INVENTOR
Harry T. Anderson
By Green & McCallister
His Attorneys Patented Oct. 3, 1933

1,928,826

UNITED STATES PATENT OFFICE 1,928,826

LEVELING AND SAFETY DEVICE

Harry T. Anderson, Butler, Pa.

Application August 5, 1929. Serial No. 383,525

9 Claims. (Cl. 188—210)

This invention relates to brake beams for railway cars and particularly to leveling and safety devices therefor.

An object of the invention is to provide for maintaining the brake shoes of a railway car in such a position during operation that the surface of the shoes will engage the car wheels uniformly.

Another object of the invention is to provide for operating brake beams of railway cars in a predetermined plane.

A further object of the invention is to provide a brake safety and leveling device that may be yieldingly secured to a support.

A still further object of the invention is to provide a leveling and safety device that shall be simple in construction, reliable in operation and easily manufactured and installed.

And a still further object of the invention is to prevent brake beams and the like from falling upon the track rails.

Other objects of the invention will appear to those skilled in the art from the following description taken in conjunction with the accompanying drawings in which:

Figure 1 is a partial view in perspective of a brake beam and a leveling and safety device arranged and constructed in accordance with the invention.

Fig. 2 is a partial view in section showing a modified form of the invention.

Fig. 3 is a partial view in section showing a leveling and safety device supported from two angle members.

Fig. 4 is a partial top plan view of the safety and leveling device.

Fig. 5 is a side view partly in section of the device shown in Figs. 1 and 4, the safety and leveling device being clamped in position to its support.

Fig. 6 is a partial side view, partly in section, illustrating another modification of the device shown in Fig. 4; and Fig. 7 is a partial view in section illustrating the safety and leveling device in its unclamped position in full lines; and in its clamped position in broken lines.

Referring to Fig. 1 of the drawings, a brake beam, designated generally by the reference character 10, is shown that comprises a compression member 11, a tension member 12, a strut 13, and brake heads 14 and 15. The brake heads 14 and 15 are provided with the usual brake shoes 16.

The brake heads 14 and 15 may be secured to the ends of the compression member in any manner well known in the art. As shown, the tension member 12 may pass through openings in the brake blocks and the proper tension applied by means of nuts 17 threaded on the ends thereof, so that the beam may be stiff and rigid. The strut 13 is provided with a bearing 18 for receiving a pin or bolt disposed to secure a forked member (not shown), known as a brake lever fulcrum. A brake lever (not shown) may be connected to the forked member for effecting either the application or the release of the brakes.

The brake beam 10 may be suspended from the usual truck frame (not shown) of the railway car (not shown) by means of brake hangers or links 19 of U-shape.

In railway practise it is always desirable that the brake beam 10 always remain in such a position that the top of the brake shoes 16 will not ride or drag upon the car wheels when the brakes are released, and that the surface of the brake shoes, when the brakes are applied, will wear uniformly. It is also desirable, to provide some means or safety device for preventing the brake beam 10 from falling upon the track rails in the event that one or both of the brake hangers or links 19 should break.

In order to insure that the tops of brake shoes 16 will not ride or drag upon the wheels, when the brakes are released and also to insure that the surface of the brake shoes will wear evenly when the brakes are applied; and further, to prevent the brake beam from falling upon the track rails if the brake hangers or links 19 should break, brake beam leveling and safety devices 20 are provided. The leveling and safety devices are resiliently or yieldingly mounted upon a transverse member or channel 21, commonly known as a spring plank. In accordance with common practise, the spring plank is mounted transversely of the truck frame (not shown) and disposed between the truck wheels.

Since the leveling and safety devices 20 are substantially similar in construction, one only will be described in detail.

The brake beam leveling and safety device may be made from a blank strip of metal, preferably steel, from which two tongues 22 may be punched and bent at substantially right angles to the body of the blank. The upper ends of the tongues 22 may be so bent as to provide flanges 23. The portion of the blank between the tongues 22 may be arched upwardly as indicated at 24, in order that the leveling and safety devices will grip or be firmly secured to the spring plank. The ends of the devices 20 may be bent upwardly to such an extent that they will either be in contact with the tension member 12 of the brake beam, or in close proximity thereto, but spaced from the compression member 11. As shown in Fig. 1 of the drawings, one end of each of the devices 20 is shown pressing upwardly against the tension member 12, thereby insuring that the brake beam will be held in a horizontal position in operation.

The ends of the safety devices extending in opposite directions from the tongues 22 operate as cantilever beams because they are anchored to the clamped portion of the safety device which comprises the tongues and the arched portion of the blank constituting the safety device, the ends of the device being disposed to support the brake beam in the event that the brake beam hangers or links 19 should break. The other ends of the safety devices are disposed to engage, or to be in close proximity to, the tension member of another brake beam 10 (see Fig. 4).

The safety device 20 may be secured to the spring plank 21 by placing it beneath the plank as shown in full lines in Fig. 7, and the ends thereof pressed upwardly, thereby forcing the flanges 23 into locking engagement with the top of the side walls of the spring plank (see the broken line position in Fig. 7).

In order to prevent the safety devices from moving longitudinally of the spring plank, the arched portion 24 may be provided with "upsets" or lugs 25 and 26. The lugs are disposed to register with apertures in the bottom of the spring plank. As an alternative, or modification, the spring plank may be provided with a lug or "struck out" member 27 disposed to register with an opening or aperture in the arched portion 24 of the safety device. (See Fig. 6.)

In Fig. 2 of the drawings, another modified form of the invention is shown in which the side walls of the spring plank are provided with notches 28 with which the flanges (23) of the tongues 22 may register, thereby preventing movement of the safety devices 20 longitudinally of the spring plank 21.

The tongues 22 and the flanges 23, taken in conjunction with the arched portion 24 of the leveling and safety devices 20 may be considered functionally as a clamp by means of which the devices 20 are yieldingly or resiliently mounted upon or secured to the spring plank or support.

In Fig. 3 of the drawings, a modified form of support for the safety devices 20 is shown. The support there shown comprises two angle members 29 and 30 so arranged that the flanges 23 of the tongues 22 of the safety devices 20 snap over the top edge of the vertically disposed flanges 31 and 32 of the angle members when the safety devices are attached to the supports in their respective operative positions.

In order to prevent movement of the devices 20 longitudinally of the angle members 29 and 30, bolts 33 are provided. The bolts 33 pass through the tongues 23 and the vertical flanges 31 and 32 of the angle members. The bolts may be locked in place by means of nuts threaded on the ends of the bolts or by other equivalent means well known in the art.

In normal operation the ends of the safety devices 20 function to maintain the associated brake beams 10 in a horizontal position, as shown in the drawings, or in any predetermined position depending upon the type of brake beam. In the event that the brake beam hangers or links 19 should break, the compression member 11 of the brake beam will fall upon and be supported by the resilient ends of the safety devices 20, thereby preventing the brake beam from falling upon the track rails.

By the invention, a brake-beam leveling and safety device is provided that is simple in construction, reliable in operation and easily manufactured and installed.

While several modifications of the brake-beam leveling and safety device have been shown and described, it is to be understood that the modifications shown are merely illustrations of the invention and not limitations. It is desired, therefore, that only such limitations shall be placed on the invention as are imposed by the prior art and the appended claims.

What I claim as new and desire to secure by Letters Patent is:

1. In a leveling and safety device for brake-beams, in combination, a spring plank, a resilient member having its opposite ends disposed to maintain a brake-beam in its normal operating position and a yieldable clamping member integral with said resilient member and for releasably securing it to said spring plank.

2. In a leveling and safety device for brake-beams, in combination, a spring plank, a resilient member having its opposite ends disposed to maintain a brake-beam in its normal operating position, a yieldable clamping member integral with said resilient member disposed to secure said resilient member to said spring plank, and means disposed to prevent relative movement between the resilient member and the spring plank.

3. In combination, a spring plank, and a brake-beam safety and leveling member having a clamp portion intermediate the ends thereof and integral therewith disposed to snap over opposite sides of the spring plank, when mounted in place on said plank.

4. A brake-beam safety and leveling member having a resilient clamp between the ends thereof and integral therewith.

5. A brake-beam safety member having upwardly curved end portions, a curved portion between said end portions having a radius of curvature opposite to that of the end portions and a clamp integral with said oppositely curved portion.

6. A brake-beam safety device comprising two oppositely disposed cantilever beams and a yieldable clamp between adjacent ends of the beams, joining said beams as an integral structure, said clamp being adapted to be sprung into place.

7. A brake-beam safety device comprising two oppositely disposed cantilever beams, and a yieldable clamp integrally joined to adjacent ends of said beams.

8. A brake-beam safety device comprising an elongated resilient member having a resilient clamp formed by flanged tongue portions struck out at substantially right angles to the plane of said member.

9. A brake-beam safety device adapted to be removably mounted upon a support, comprising two oppositely disposed cantilever beams, a yieldable clamp between adjacent ends of said beams and integral therewith, and means disposed to cooperate with said clamp and beam for preventing movement of the safety device longitudinally of the support.

HARRY T. ANDERSON.